United States Patent [19]

Kos et al.

[11] Patent Number: 5,696,761
[45] Date of Patent: Dec. 9, 1997

[54] METHOD AND APPARATUS FOR INTERFACING LOW SPEED ACCESS LINKS TO A HIGH SPEED TIME MULTIPLEXED SWITCH FABRIC

[75] Inventors: Richard James Kos, North Riverside; Robert Lee Pawelski, Lisle, both of Ill.

[73] Assignee: Lucent Technologies Inc, Murray Hill, N.J.

[21] Appl. No.: 522,216

[22] Filed: Aug. 31, 1995

[51] Int. Cl.[6] ........................................... H04L 5/22
[52] U.S. Cl. ............................... 370/386; 370/541
[58] Field of Search ........................ 390/58.1, 58.2, 390/68, 112, 386, 541

[56] References Cited

U.S. PATENT DOCUMENTS

| | | | |
|---|---|---|---|
| 5,005,171 | 4/1991 | Modisette, Jr. et al. | 370/112 |
| 5,323,390 | 6/1994 | Pawelski | 370/63 |
| 5,329,524 | 7/1994 | Paker et al. | 370/58.1 |
| 5,351,236 | 9/1994 | Pawelski | 370/58.1 |
| 5,436,889 | 7/1995 | Matsumoto et al. | 370/112 |
| 5,452,307 | 9/1995 | Koyama et al. | 370/112 |

OTHER PUBLICATIONS

W. A. Payne et al., "SpectraNet, A High Speed, Synchronous Switch For Broadband STM Communication, XIV International Switching Symposium", Yokohama, Japan Oct. 1992, pp. pp. 1–5.

*Primary Examiner*—Melvin Marcelo
*Attorney, Agent, or Firm*—Dennis J. Williamson

[57] ABSTRACT

A high speed time multiplexed switch (TMS) fabric unit for use in a telecommunications system having relatively low speed TMS access links. To receive signals from the low speed access links, the TMS fabric unit of the invention consists of a plurality of programmable multiplexers where each programmable multiplexer is connected to a predetermined number, J, of the access links. Each access link carries M time slots where M is a relatively large number, i.e. 100. The programmable multiplexers put the content of the access links onto two high speed links. The speed of the high speed links is at least J times the speed of the access links such that for each time slot on the access links there is a fixed group of at least J time slots on each high speed link. Each of the two high speed links deliver the signals to at least one high speed TMS fabric where the speed of the high speed links is matched to the reconfiguration rate of the high speed TMS fabric. To transmit signals from the high speed fabric to the low speed access links, the above-described arrangement is essentially duplicated in that two high speed links connect the high speed TMS fabric to programmable demultiplexers. The programmable demultiplexers deliver the content of the fixed group of J time slots on the high speed links to J access links. The TMS fabrics are non-blocking space division switches between the high speed links coming from the programmable multiplexers and the programmable demultiplexers.

10 Claims, 6 Drawing Sheets

FIG. 3

| ACCESS LINK TIME SLOTS | CORRESPONDING FIXED GROUP HIGH SPEED LINK TIME SLOTS |
|---|---|
| $LS_1$ | $HS_1$ THROUGH $HS_J$ |
| $LS_2$ | $HS_{J+1}$ THROUGN $HS_{2J}$ |
| $LS_3$ | $HS_{2J+1}$ THROUGH $HS_{3J}$ |
| ⋮ | ⋮ |
| $LS_M$ | $HS_{(M-1)J+1}$ THROUGH $HS_{MJ}$ |

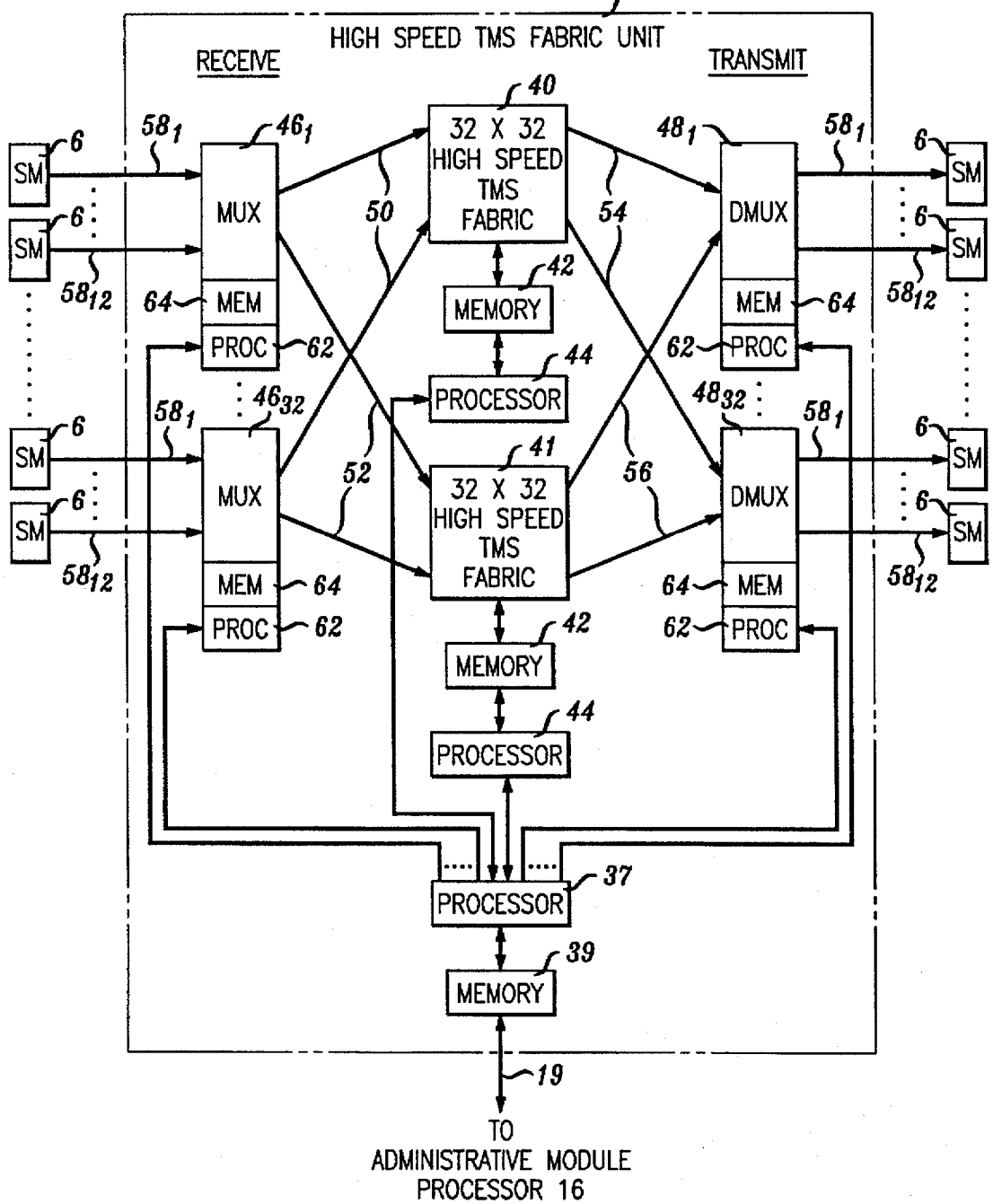

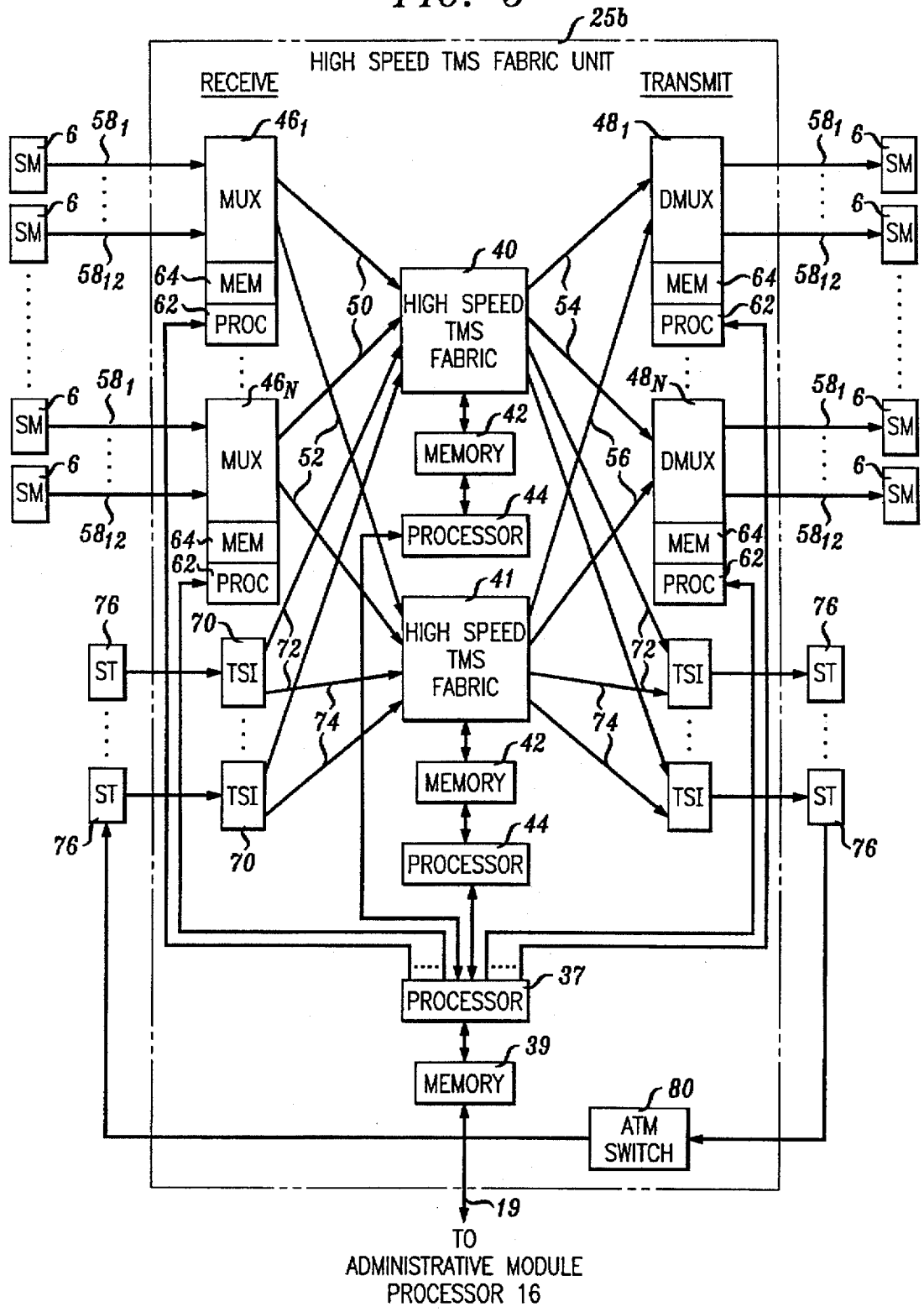

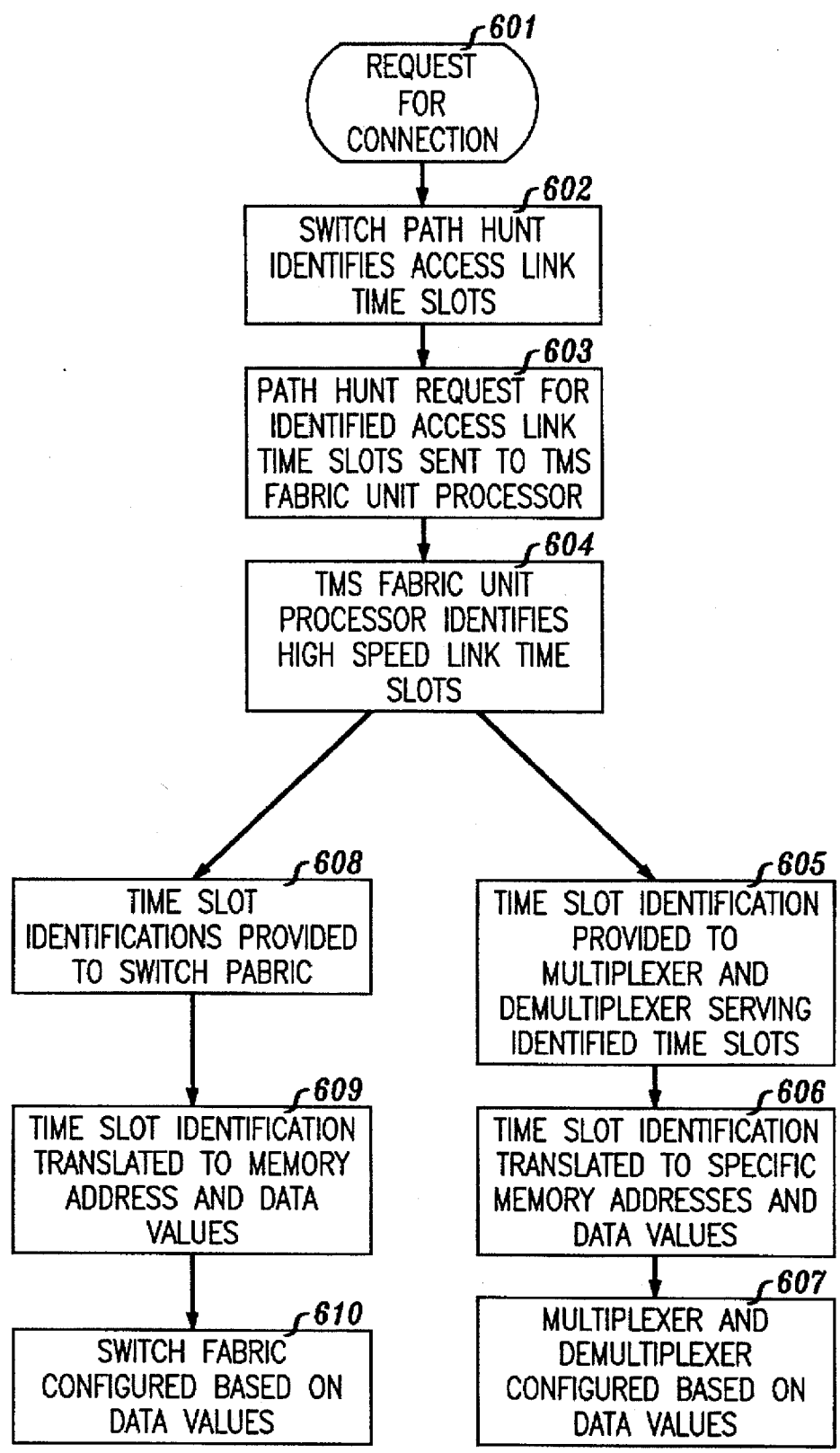

METHOD AND APPARATUS FOR INTERFACING LOW SPEED ACCESS LINKS TO A HIGH SPEED TIME MULTIPLEXED SWITCH FABRIC

BACKGROUND OF THE INVENTION

The invention relates, generally, to a method and apparatus for interfacing low speed access links to a high speed time multiplexed switch fabric and, more particularly, to the implementation of a high speed switch fabric in existing telecommunications networks switching systems having low speed access links through the use of the method and apparatus of the invention.

It will be appreciated that a typical telecommunications network include a plurality of switching systems connected to one another over trunks and connected to customer premise equipment (CPE), such as station sets, multimedia equipment or the like, over voice and data lines. The switching systems route calls through the network to provide connectivity between CPEs as will be understood. A call control signaling network, such as an SS7 network, overlays the voice and data network and provides signaling for controlling the routing of the voice and data signals. The call control signals are also routed through the switching systems. The switching systems must be capable of handling a large volume of signal traffic with minimum delays, errors or blocked calls.

Current switching systems typically include a time multiplexed switch fabric for internally routing the signals through the switch. It is to be understood that the switch fabric is that portion of the switching system where connections are selectively made between an input and an output to create a path for routing a call. For example, one current switch has a switch fabric with a reconfiguration rate of 256 times per 125 microseconds where the reconfiguration rate is the number of separate connections the switch fabric can make per unit time per physical link pair. Signals are delivered to and received from the fabric via time multiplexed access links where each link carries 256 time slots per 125 microseconds. The speed of the access links is the same as the reconfiguration rate of the switch fabric such that the switch fabric can process the incoming signals at the rate the signals are received from the access links. In order to accommodate the current volume of traffic in the switching system and achieve satisfactory blocking performance a relatively large (i.e. 192×192) switch fabric is used. While such switch fabrics are adequate for routing existing telephone service, they are relatively slow when compared to the latest high speed switch fabrics.

The newest switch fabrics offer a much higher reconfiguration rate. For example, existing high speed switch fabrics, such as SpectraNet, developed by AT&T and described in "SpectraNet, A High Speed, Synchronous Switch For Broadband STM Communication", XIV International Switching Symposium, Yokohama, Japan, October 1992, sponsored by the Institute of Electronics, Information and Communication Engineers, have reconfiguration rates on the order of 30 to 40 times faster than the switch fabrics currently being used by existing switching systems. Because of the extremely fast reconfiguration rates of these fabrics, much smaller high speed TMS fabrics can be used in place of the switch fabrics currently being used to achieve the same non-blocking performance. It will be appreciated that the use of smaller, faster switch fabrics would be more efficient and less expensive than the fabrics currently being used in the switching systems. The use of high speed fabrics such as the Spectra-Net fabric in telecommunications switching systems is disclosed in U.S. Pat. No. 5,329,254 issued to Paker et at. on Jul. 12, 1994, U.S. Pat. No. 5,351,236 issued to Pawelski on Sep. 27, 1994 and U.S. Pat. No. 5,323,390 issued to Pawelski on Jun. 21, 1994.

Not only do such high speed switch fabrics enhance the performance for existing telephone service, the expected growth of synchronous transport facilities based on the Synchronous Digital Hierarchy (SDH)/Synchronous Optical Network (SONET) standard, set forth by the American National Standards Institute, Inc., Digital Hierarchy, Optical Interface Rates and Formats Specifications, require a switch fabric that can directly switch the Synchronous Transfer Mode (STM) traffic supported by the new transmission standard. The SONET/SDH standards support a diverse services network including high rate services based on switched virtual tributary and synchronous transport signal connections such as video, distance learning and telecommuting, video telephony, multimedia and cable television.

While the advantages and advances resulting from the use of high speed switching fabrics are recognized, existing telecommunications networks typically include low speed access links for delivering signals to the relatively slow speed switch fabric where the speed of the access links equals the reconfiguration rate of the slow speed switch fabrics as previously described. Because the high speed switch fabrics have a much higher reconfiguration rate, it is not technically possible to simply replace the low speed switch fabrics with the high speed switch fabrics and deliver signals to the high speed switch fabric over the existing low speed access links. It will be understood that it is also not economically or commercially feasible to replace all existing low speed access links with high speed links where the speed of the links is the same as the reconfiguration rate of the high speed switching fabric. Therefore, in order to use high speed switching fabrics in existing switching systems, it is necessary to interface the existing low speed access links with the high speed switching fabric in a way that does not create blocking or increase delay in the switching system. Also, the connectivity through the fabric must be at least as good as the existing connectivity achieved where the low speed access links are connected directly to low speed switching fabrics.

Thus, a problem in the art exists in that high speed switching fabrics are not matched to the slow speed access links found in existing switching systems such that the high speed switching fabrics cannot be used in existing switching systems.

SUMMARY OF THE INVENTION

The method and apparatus of the invention solves the above-noted problem by providing a high speed time multiplexed switch (TMS) fabric unit for use in a telecommunications system having relatively low speed TMS access links. To receive signals from the low speed access links, the TMS fabric unit of the invention consists of a plurality of programmable multiplexers where each programmable multiplexer is connected to a predetermined number, J, of the access links. Each access link carries M time slots where M is a relatively large number, e.g. 100. The programmable multiplexers put the content of the access links onto two high speed links. The speed of the high speed links is at least J times the speed of the access links such that for each time slot on the access links there is a fixed group of at least J time slots on each high speed link. The two high speed links deliver the signals to at least one high speed TMS fabric where the speed of the high speed links is matched to the reconfiguration rate of the high speed TMS fabric. To transmit signals from the high speed fabric to the low speed access links, the above-described arrangement is used in reverse. Two high speed links connect the high speed TMS fabric to programmable demultiplexers and the programmable demultiplexers deliver the content of the fixed group of J time slots on the high speed links to J access links. The TMS fabric is a non-blocking space division switch between the high speed links connecting the programmable multiplexers and the programmable demultiplexers, and the programmable multiplexers and demultiplexers provide the interface between the high speed links and the existing low speed access links.

BRIEF DESCRIPTION OF THE DRAWING

FIG. 3 is a table illustrating the operation of the TMS fabric unit of the invention;

FIG. 4 is an alternate embodiment of the TMS fabric unit of the invention;

FIG. 5 is another alternate embodiment of the TMS fabric unit of the invention;

FIG. 6 is a flow diagram illustrating the method of operation of the switch fabric unit of the invention.

DETAILED DESCRIPTION

Figure 1:
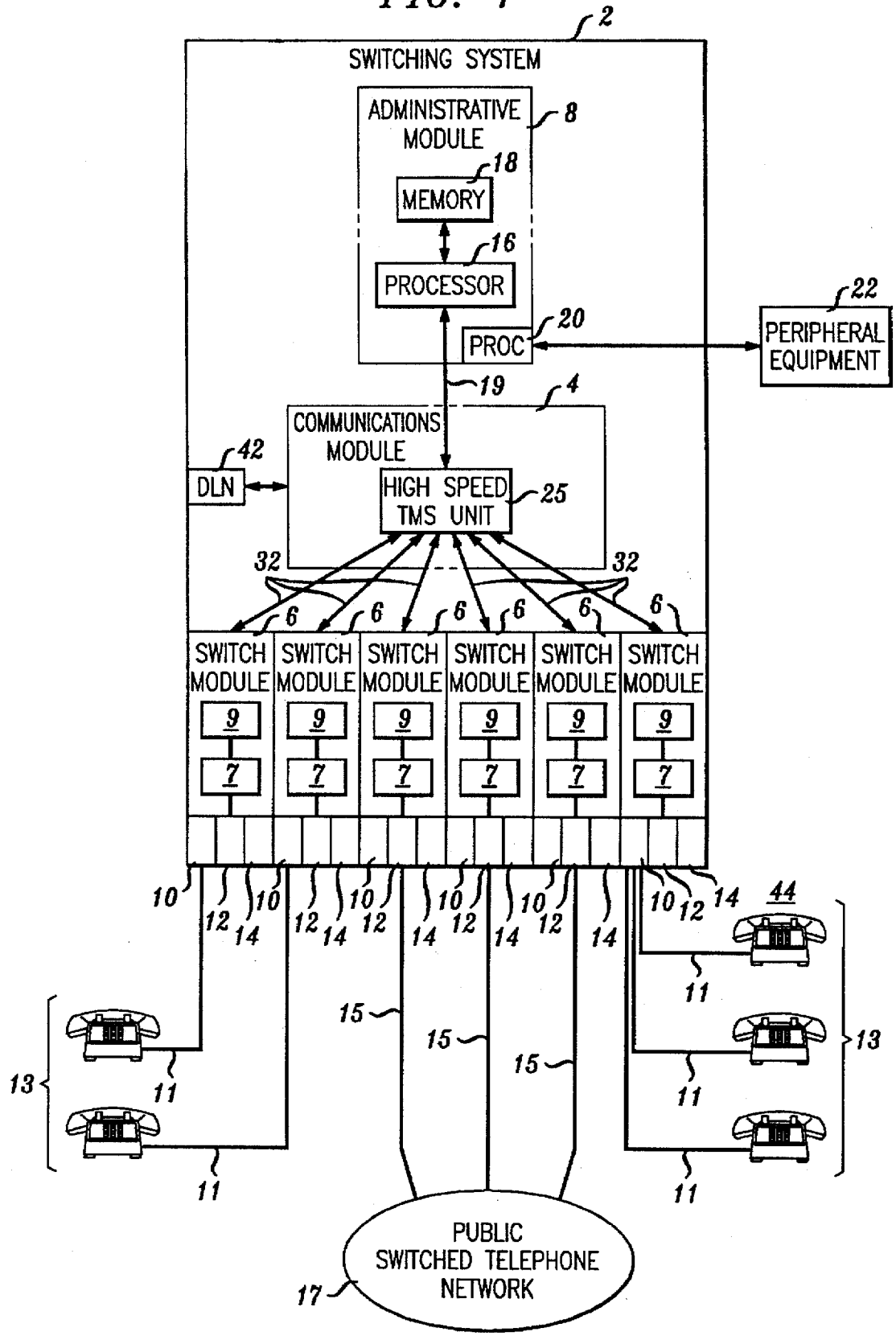
FIG. 1 is a block diagram of a switching system employing the TMS fabric unit of the invention.

The operation of the system of the invention will be described with particular reference to ISDN electronic switching system 2 shown in FIG. 1 and described in U.S. Pat. No. 4,592,048 issued to Beckner et al. on May 27, 1986. Such a switching system can consist of one of the 5ESS® family of switches, described in AT&T Technical Journal, Vol. 64, No. 6, part 2, pp. 1305–1564, July/August 1985, and manufactured by AT&T. The architecture of such a switching system includes a communications module 4 forming a hub and having a plurality of switch modules 6, and an administrative module 8 emanating therefrom. Each switch module 6 is controlled by processor 7 and a local data base 9; each switch module 6 provides call processing, time division switching and signaling for the lines and trunks to which it is connected. Line units 10 provide interface to customer lines 11 that connect to customer premise equipment 13, and trunk units 12 provide interface to trunks 15 that connect to other elements of the network 17 such as switches. Circuit units 14 provide tones, announcements, recorded messages, tone decoding and the like. The administrative module 8 provides functions that can be centralized such as maintenance control, craft interface, text and data base management, call routing and time slot allocation. The administrative module 8 consists of a control unit such as the AT&T 3B21D duplex processor 16 and main memory store 18. In some systems the administrative module is assisted by a separate processor (not shown) that performs some of the administrative functions. The administrative module 8 also can include an input/output processor 20 providing communication between switching system 2 and peripheral devices 22 such as terminals, printers or the like. Communications module 4 is the hub of the switching system and communicates with the administrative module 8 over data link 19 and the switch modules 6 over low speed access links 32.

Communications module 4 consists of a message switch that provides the administrative module-to-switch module and switch module-to-switch module message communications and a time multiplexed switch providing the switch module-to-switch module and switch module-to-administrative module time slot connection for voice and data communication and the clock distribution. The message switch of communications module 4 includes the high speed TMS fabric unit 25 of the invention. It will be appreciated that while the previously described switch architecture relates specifically to the AT&T 5ESS® switch, the switch fabric unit of the invention can be used in any switch and the specific switch architecture may vary.

Figure 2:
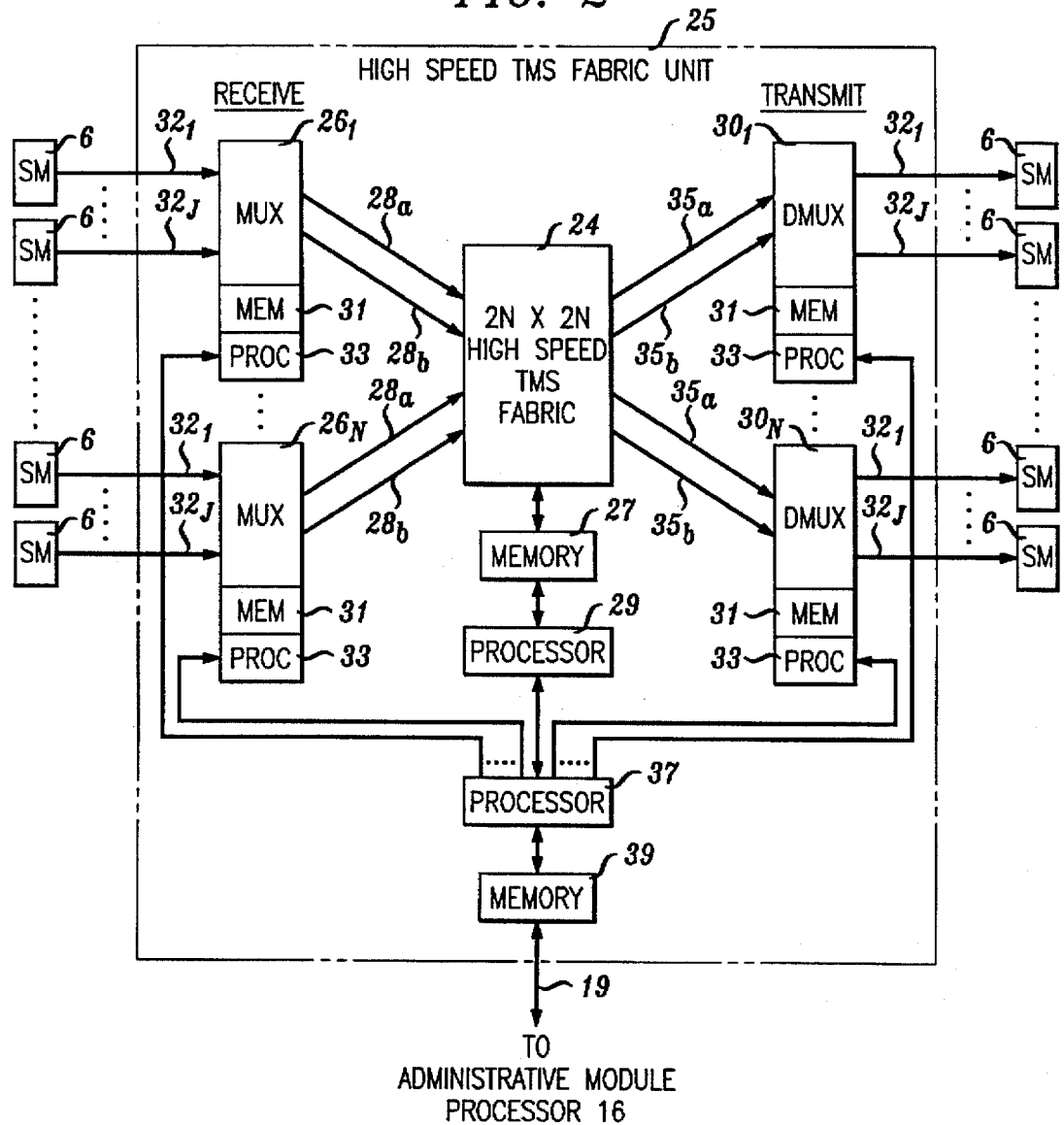
FIG. 2 is a block diagram of the TMS fabric unit of the invention.

Referring to FIG. 2, the TMS fabric unit 25 of the invention includes a high speed switch fabric 24 that is a non-blocking space division switch that configures its cross-connects for each high speed link time slot period based on the content of control memory 27 as will hereinafter be described. The high speed switch fabric 24 can consist of the SpectraNet fabric, discussed above, or any similar high speed fabric. It will be appreciated that the TMS fabric unit 25 of the invention is intended to operate in any system where a high speed switch fabric is used with relatively low speed access links.

The switch fabric 24 includes a control unit consisting of a dual port memory 27 and a processor 29. The dual port memory 27 receives input from TMS fabric unit processor 37 dictating configuration of the switch fabric. The input received by memory 27 is used by processor 29 to control the configuration of switch fabric 24. The operation of the processor 29 and memory 27 for controlling the switch fabric configuration is described in detail in U.S. Pat. No. 5,329,524 issued to Paker on Jul. 12, 1994.

The receive side of TMS fabric unit 25 includes a plurality of programmable multiplexers $26_1$, through $26_N$, each communicating with TMS fabric 24 over high speed links 28a and 28b. Likewise, the transmit side of communications module 4 includes a plurality of programmable demultiplexers $30_1$ through $30_N$, each also communicating with TMS fabric 24 over high speed links 35a and 35b. The speed of links 28a, 28b and 35a, 35b is matched to the reconfiguration rate of switch fabric 24. Each of the multiplexers $26_1$ through $26_N$ and demultiplexers $30_1$ through $30_N$ receive signals over a plurality of relatively low speed access links $32_1$ through $32_J$. Access links $32_1$ through $32_J$ connect TMS fabric unit 25 to switch modules 6 for receiving and transmitting intraswitch signals between the switch modules as described with reference to FIG. 1. It will be appreciated that while the flow of signals is unidirectional, each switch module receives as well as transmits signals such that the illustrated configuration is duplicated for each switch module such that signals can be received from and transmitted to every switch module. The programmable multiplexers and demultiplexers each include a control unit consisting of a memory 31 and a processor 33 for controlling the configuration of the devices such that the connections through the multiplexer and demultiplexer can be made in any desired sequence to connect time slots on access links $32_1$ through $32_J$ to time slots on high speed links 28a, 28b and 35a, 35b as desired. It will be appreciated that while in the illustrated embodiment each multiplexer and demultiplexer is provided with its own memory and processor, a single processor and memory could be shared by multiple multiplexers and demultiplexers. Moreover, each of the multiplexers $26_1$ through $26_N$ and demultiplexers $30_1$ through $30_N$ could be replaced by a combined multiplexer/demultiplexer to allow some connections to be made through the multiplexer/ demultiplexer without transmitting the signals through the switch fabric, if desired.

Each access link $32_1$ through $32_J$ carries M time slots where M is a relatively large number, for example, 100. The speed (bit rate) of each high speed link 28a, 28b and 35a, 35b is at least J times the speed (bit rate) of each access link $32_1$ through $32_J$ where J is the number of access links on each of the multiplexers $26_1$ through $26_N$ and demultiplexers $30_1$ through $30_N$. Thus, for each access link time slot there are at least J time slots on each high speed link.

Moreover, for each access link time slot there is a corresponding fixed group of J time slots on each high speed link. Thus, as shown in Table 1 of FIG. 3, time slots $HS_1$ through $HS_J$ on each high speed link are a fixed group corresponding to time slot $LS_1$ on the access links, time slots $HS_{J+1}$ through $HS_{2J}$ are the fixed group on the high speed links corresponding to time slot $LS_2$ on the access links and so on. Each high speed link 28a, 28b and 35a, 35b carries M fixed groups of time slots, where M is the number of access link time slots as previously defined.

During one access link time slot period, the programmable multiplexer hosting that access link fills the corresponding fixed group on each high speed link connected to the multiplexer. For example, during time slot period $LS_1$ of the access links hosted by multiplexer $26_1$, the multiplexer $26_1$ places the content from the $LS_1$ time period for each of access links $32_1$ through $32_J$ on the corresponding high speed time slots $HS_1$ through $HS_J$ of the high speed links 28a and 28b connected to multiplexer $26_1$. For each fixed group time slot on each of the high speed links, the programmed multiplexer either takes the content of the corresponding time slot from one of the access links or uses a default pattern if the time slot is idle. Likewise, the programmed demultiplexers $30_1$ through $30_N$ have available one fixed group of time slots from the two high speed links 35a and 35b at any one time. During one access link time slot period, the programmed demultiplexer 30 either takes the content of a fixed group time slot from one of the high speed links 35a or 35b or it uses a default pattern for an idle time slot.

The content of one time slot for all of the access links $32_1$ through $32_J$ must be available at the programmed multiplexers $26_1$ though $26_N$ before the transfer of the contents of the access links to the fixed group of time slots on the high speed links begins. Similarly, at the programmed demultiplexers $30_1$ through $30_N$, all of the contents for a fixed group of time slots of the high speed links must be available before the contents are transferred to the corresponding time slots on access links $32_1$ through $32_J$. Thus, both the programmed multiplexers and demultiplexers have memory to hold the time slot content for one access link time slot period. Because the number, M, of access link time slots is large, the delay of one time slot period is a small fraction of the frame period and is, therefore, insignificant.

The use of two high speed links 28a and 28b provided at each multiplexer and two high speed links 35a and 35b provided at each demultiplexer make the effective size of a fixed group of time slots on the high speed links 2J because there are J time slots on each of the two high speed links. As a result, the high speed TMS fabric has non-blocking performance according to Clos' non-blocking performance formula for any access link time slot as defined in "A Study Of Non-blocking Switching Networks", *The Bell System Technical Journal*, Volume XXXII, March 1953, pages 406–424. To briefly explain this result, assume that any two access links $32_1$ and $32_2$ are to be connected for an idle access link time slot designated time slot $LS_3$. The multiplexer connected to access link $32_1$ and the multiplexer connected to access link $32_2$ can each have at most J-1 high speed link fixed group time slots in use for time slot $LS_3$ such that together at most 2(J-1) time slots are used. Therefore, there at least two time slots in the fixed group of time slots on the high speed links that are idle for time slot $LS_3$ for both access links. For each of the two access links, the same fixed group time slot and the same high speed link are used at both the demultiplexer and multiplexer for the connection. Thus, if the two access links, $32_1$ and $32_2$ are on different multiplexers, then one of the two idle time slots is sufficient to make the connection, and if the two access links are on the same multiplexer, then two of the idle time slots are used for the connection. It will be appreciated that if the effective size of the fixed group of time slots on the high speed links is less than 2J-1 the system will operate but with some probability of blocking.

The switch fabric unit 25 includes a processor 37 and a memory 39 in communication with the control units of each of the multiplexers $26_1$ through $26_N$, demultiplexers $30_1$ through $30_N$ and switch fabric 24. The processor 37, upon receipt of a path hunt request from administrative module processor 16, performs a path hunt for determining a path through the TMS fabric unit 25 for connecting a calling CPE to a called CPE. Specifically, a path is determined for connecting an inlet time slot on the access link connected to the switch module hosting a calling CPE and an outlet time slot on the access link connected to the switch module hosting the called CPE. The inlet time slot and outlet are identified to the TMS fabric unit processor 37 by administrative module processor 16 after administrative module processor 16 performs a path hunt on the access links connecting the calling CPE to the called CPE as is generally known. Once processor 37 determines a path (i.e., identifies idle time slots on the high speed links that are able to connect the idle inlet and outlet time slots on the access links previously identified by processor 16), the time slots identified by processor 37 are sent to the memories 31 of the multiplexer and demultiplexer that serves the identified time slots and to the memory 27 of the switch fabric 24. The processors 33 and 29 configure the multiplexer, demultiplexer and switch fabric in response to the time slots sent by processor 37 to connect the appropriate switch modules and complete the call.

In another embodiment, TMS switch fabric unit 25a is configured as illustrated in FIG. 4 and consists of a pair of high speed 32×32 TMS fabrics 40 and 41 such as the SpectraNet fabric developed by AT&T. This TMS fabric has a maximum reconfiguration rate of 9,720 times per 125 microseconds and is a non-blocking space division switch that configures its cross-connects for each high speed link time slot period based on the content of control memory 42. While a specific high speed TMS fabric is described, it will be appreciated that the system of the invention is intended to operate with any high speed switch fabric used in conjunction with relatively low speed access links. Further, while the TMS fabric unit 25a is described as being composed of two 32×32 TMS fabrics, it is to be understood that the size of the fabric is related to the speed of the high speed links and the desired signal capacity of the switching system. For example, in the illustrated embodiment the two 32×32 TMS fabrics can be replaced by a single 64×64 TMS fabric although the use of the two smaller fabrics is more efficient. Each of the switch fabrics includes a control unit consisting of a memory 42 and a processor 44 for controlling the configuration of the switch fabric in response to path information provided by the TMS fabric unit processor 37.

The receive side of TMS fabric unit 25a includes a plurality of programmable multiplexers $46_1$ through $46_{32}$, each communicating with TMS fabric 40 over high speed links 50 and with TMS fabric 41 over high speed links 52. Likewise, the transit side of TMS fabric unit 25a includes a plurality of programmable demultiplexers $48_1$ through $48_{32}$ each communicating with TMS fabric 40 over high speed links 54 and with TMS fabric 41 over high speed links 56. In the illustrated embodiment the high speed links 50, 52, 54 and 56 consist of a SONET OC-12 optical carrier which carries twelve standard OC-1 interfaces, each standard OC-1 interface having 672 payload time slots and each time slot using 8 bits. The basic rate of the SONET OC-12 is 622.08 mb/s. The connections within multiplexers $46_1$ through $46_{32}$ are controlled by dedicated control units consisting of a processor 62 and memory 64 although, as previously described, a single control unit could be used to control multiple multiplexers and demultiplexers.

Each of the programmed multiplexers $46_1$ through $46_{32}$ consists of twelve inputs connected one each to access links $58_1$ through $58_{12}$. The outputs of multiplexers $46_1$ through $46_{32}$ are connected to high speed links 50 and 52. Likewise, each of the programmed demultiplexers $48_1$ through $48_{32}$ consists of twelve outputs connected one each to access links $58_1$ through $58_{12}$ and two inputs connected to high speed links 54 and 56. The connection of the inputs to the outputs is controlled by processors 62 based on the input in memories 64. The access links $58_1$ through $58_{12}$ connect the programmed multiplexers and demultiplexers to switch modules 6. The access links are typically connected to the switch modules 6 by appropriate interface circuits as will be understood. Each of the access links preferably consists of a TMS link which carries 256 time slots that are 16 bits wide. For purposes of this invention, each TMS link can be treated as having 512 time slots that are 8 bits wide.

With 512 time slots on each access link, the OC-12 high speed links must be divided into 512 fixed groups as previously described with reference to FIG. 3. For convenience, each of the twelve OC-1s that comprises the OC-12 has one time slot designated for each fixed group where each OC-1 has 672 payload time slots. Because an OC-12 is more than 12 times faster than a TMS link, only 512 of 672 time slots in the OC-1 fixed group are actually used. Because the above-described embodiment does not use the entire OC-12 payload, more than 12 TMS links can be handled if more complex programmed multiplexers and demultiplexers are used.

Referring to FIG. 5, the TMS fabric unit 25b includes processor 37 and memory 39 for performing the path hunt through TMS fabric unit 25b in response to the path hunt request from administrative module processor 16 as previously described with reference to FIG. 2. Processor 37 communicates with each of memories 64 and 42 to identify the time slots identified from the path hunt such that the TMS fabrics 40 and 41, multiplexers 46 and demultiplexers 48 can be configured to connect the identified time slots.

Referring more particularly to FIG. 5 an arrangement for supporting both broadband and narrow band services using the TMS fabric unit of the invention is illustrated. Specifically, the programmed multiplexers $46_1$ through $46_{32}$ and demultiplexers $48_1$ through $48_{32}$ are connected to the switch modules 6 via low speed access links $58_1$ through $58_{12}$ and to the high speed TMS switch fabrics via high speed links 50 and 52 as described with reference to FIG. 4. Moreover, the high speed switch fabrics 40 and 41 are also connected to time slot interchangers 70 over the high speed links 72 and 74, respectively. The time slot interchangers 70 are connected to SONET terminals 76 over high speed links 78 such as OC-12 links and the SONET terminals 76 are connected to ATM switch 80. For narrow band services (voice) the switch fabric unit operates as described above. For broadband services, the fabric unit operates as set forth in U.S. Pat. No. 5,329,524 issued to Paker on Jul. 12, 1994. Thus, the fabric unit illustrated in FIG. 5 allows a switching system to handle both broadband and narrow band services through a single switch fabric unit. It will be appreciated that SONET facilities can carry both synchronous transfer mode (STM) and asynchronous transfer mode (ATM) payloads. The switch fabric unit can be used to separate these payloads and deliver the ATM portion to an ATM switch 80 such as a Globeview-2000 manufactured and sold by AT&T.

The operation of the system of the invention will be described with specific reference to the flow diagram of FIG. 6 and the embodiment illustrated in FIG. 2. Operation begins when a request for a connection is made by a calling CPE (block 601) identifying a called party by the dialed directory number. In response to the request for connection, a path hunt is performed by the switching system processor 16 located in administrative module 8 as is known in the an to identify an idle time slot on an access link for the inlet signals from the calling CPE and a corresponding idle time slot on an access link for the outlet signals to the called CPE (block 602).

The switching system processor 16 transmits the identified inlet and outlet time slots to the TMS fabric unit processor 37 with a request that a path hunt be performed to identify a path through the TMS fabric unit connecting the inlet and outlet time slots (block 603). The TMS fabric unit processor 37 performs a path hunt and identifies idle time slots on the high speed links 28a, 28b and 35a, 35b connected to the programmed multiplexer and demultiplexer, respectively, that connect the access link time slots identified by the switching system microprocessor 16 (block 604). It is to be understood that for any time slot selected on an access link, the time slot selected on the high speed links will be one of the time slots in the fixed group of time slots associated with the selected access link time slot. While in the illustrated invention, the access link path hunt is performed external to the fabric unit 25 by processor 16 and the high speed link path hunt is performed internal of the TMS fabric unit by processor 37, it will be appreciated that a single processor could perform the entire path hunt through the entire switching system. The use of a single or separate processors will be dictated by the desired capacity of the switch and the capabilities of the processors as will be appreciated by one skilled in the art.

The TMS fabric unit processor 37 then provides the determined path information (both the time slots on the access links originally identified by processor 16 and the time slots on the high speed links identified by processor 37) to the control units of the programmable multiplexer and the programmable demultiplexer serving the identified time slots (block 605). The programmable multiplexer and demultiplexer translate this information to specific memory addresses and data values (block 606) and the processors 33 configure the multiplexer and demultiplexer to create the path connecting the identified time slots (block 607). In the same manner, the path information is provided to the switch fabric control unit memory 27 (block 608). The switch fabric control unit translates this information to specific memory addresses and data values (block 609) and the switch fabric processor 29 configures the switch fabric based on these values to complete the path through the switch (block 610). This path is maintained until the call is terminated by one of the parties at which time, the time slots are designated idle.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. A switching system hosting a plurality of trunks and/or lines, comprising:

a) a first group of J low speed links connected to a first group of the trunks and/or lines and a second group of J low speed links connected to a second group of the trunks and/or lines where J is an integer, each of said low speed links including time slots for transmitting content;

b) a high speed switch fabric;

c) a multiplexer for transferring the content from said first group of J low speed links to said high speed switch fabric, said multiplexer including means for taking the content of one time slot from each of said first group of J low speed links and creating a fixed group of time slots, said fixed group of time slots containing the content of the one time slot from each of said first group of J low speed links and a first high speed link for transferring the content of the fixed group of time slots to said high speed switch fabric, the speed of the first high speed link being at least J times faster than the speed of the first group of J low speed links and having a fixed group of J time slots corresponding to each time slot on the low speed links wherein during one low speed link time slot period the corresponding fixed group on said first high speed link is filled;

d) a demultiplexer for transferring the content from said high speed switch fabric to said second group of J low speed links, said demultiplexer including a second high speed link for transferring the content of the fixed group of time slots from said high speed switch fabric to means for receiving the content of the fixed group of time slots and giving a portion of the content to a time slot on each of said second group of J low speed links, the speed of the high speed link being at least J times faster than the speed of the second group of J low speed links and having a fixed group of J time slots for each time slot on the low speed links; and e) means for controlling the multiplexer and demultiplexer to transfer the content from the first group of low speed links to said second group of low speed links.

2. The apparatus of claim 1, wherein the speed of said high speed link is at least as fast as the reconfiguration rate of said high speed switch fabric.

3. The apparatus of claim 1, wherein said multiplexers and demultiplexers each include a memory means for holding the time slot content for one access link time slot period such that the content of all of said access links are transferred to the fixed group of time slots on said high speed access links simultaneously.

4. The apparatus according to claim 1, wherein said control means includes a control unit for controlling the configuration of said multiplexer and demultiplexer.

5. The apparatus according to claim 4, wherein said control means further includes a processor for determining time slots for completing a connection through said apparatus, said processor providing an identification of said time slots to the control unit for the multiplexer and demultiplexer.

6. The apparatus of claim 5, wherein the processor of said switch fabric performs said path hunt in response to a request including an identification of time slots on said access links that are to be connected.

7. The apparatus of claim 1, wherein said control means includes a control unit for controlling the configuration of said high speed switch fabric.

8. The switching system of claim 1, wherein said high speed switch fabric is also connected to at least two time slot interchangers.

9. The switching system of claim 8, wherein at least two of said time slot interchanges are connected to an asynchronous transfer mode switch.

10. A method for transferring content in a switching system hosting a plurality of trunks and/or lines, comprising the steps of:

a) connecting a first group of J low speed links to a first group of the trunks and/or lines and a second group of J low speed links to a second group of the trunks and/or lines where J is an integer, each of said low speed links including time slots for transmitting content;

b) transferring the content from a first group of J low speed links to a high speed switch fabric, including the steps of taking the content of one time slot from each of said first group of J low speed links and creating a fixed group of time slots, said fixed group of time slots containing the content of the one time slot from each of said first group of J low speed links and transferring the content of the fixed group of time slots to said high speed switch fabric over a first high speed link, the speed of the first high speed link being at least J times faster than the speed of the first group of J low speed links and having a fixed group of J time slots corresponding to each time slot on the low speed links wherein during one low speed link time slot period the corresponding fixed group on said first high speed link is filled;

c) transferring the content from said high speed switch fabric to said second group of J low speed links, including the steps of transferring the content of the fixed group of time slots from said high speed switch fabric to means for receiving the content of the fixed group of time slots and giving a portion of the content to a time slot on each of said second group of J low speed links, the speed of the high speed link being at least J times faster than the speed of the second group of J low speed links and having a fixed group of J time slots for each time slot on the low speed links.

* * * * *